United States Patent
Snellman et al.

[15] 3,662,533
[45] May 16, 1972

[54] GLASS FIBER CABLE

[72] Inventors: Donald L. Snellman; Willard G. Hudson, both of Seattle, Wash.

[73] Assignee: Norfin, Inc., Seattle, Wash.

[22] Filed: Jan. 5, 1970

[21] Appl. No.: 718

[52] U.S. Cl. ................................. 57/140 G, 57/7, 57/21, 57/140 C, 57/153, 57/164
[51] Int. Cl. ................... D07b 1/16, D07b 1/00, D07b 3/02
[58] Field of Search ................. 57/140 G, 153, 140 C, 144, 57/149, 7, 21, 3, 136, 160, 162, 164

[56] References Cited

UNITED STATES PATENTS

| | | |
|---|---|---|
| 3,309,861 | 3/1967 | Pierson et al. ...................... 57/140 G |
| 3,446,003 | 5/1969 | Kolek et al. ......................... 57/140 G |
| 3,395,529 | 8/1968 | Ray ....................................... 57/140 X |
| 2,369,876 | 2/1945 | Warren ................................ 57/140 UX |
| 2,775,860 | 1/1957 | Morrison ............................. 57/140 |
| 2,958,114 | 11/1960 | Marzocchi et al. ................ 57/140 UX |
| 3,029,590 | 4/1962 | Caroselli et al. ................... 57/153 |
| 3,371,476 | 3/1968 | Costello et al. .................... 57/149 |
| 3,391,052 | 7/1968 | Morzocchi .......................... 57/140 UX |

Primary Examiner—Donald E. Watkins
Attorney—Seed, Berry & Dowrey

[57] ABSTRACT

A coreless glass fiber cable is made of a plurality of individual substantially untwisted glass fiber rovings twisted together. Prior to twisting but during the twisting operation certain of the rovings are impregnated with one component of an elastomeric resin with the remainder of the rovings impregnated with the second component of the elastomeric resin. The impregnated rovings are spirally twisted together in the same direction at substantially the same helical angle, the two components of the elastomeric resin impregnating the rovings mixing with each other at the junction of the intertwining of the rovings to form a cured elastomer spacing the glass fiber rovings and filaments making up the rovings from each other. The layed up glass fiber cable is fed back on itself and subsequent layers of impregnated rovings plied together over the initial layers. The subsequently applied layers are applied at the same helical angle as the initial layer. The cable, although useful for other purposes, is particularly useful in the manufacture of endless track for track vehicles, the endless track comprising a plurality of individual track sections strung along a cable of the type mentioned.

4 Claims, 8 Drawing Figures

PATENTED MAY 16 1972

INVENTORS
DONALD L. SNELLMAN
WILLARD G. HUDSON
BY Seed, Berry & Dowrey

ATTORNEYS

FIG-3
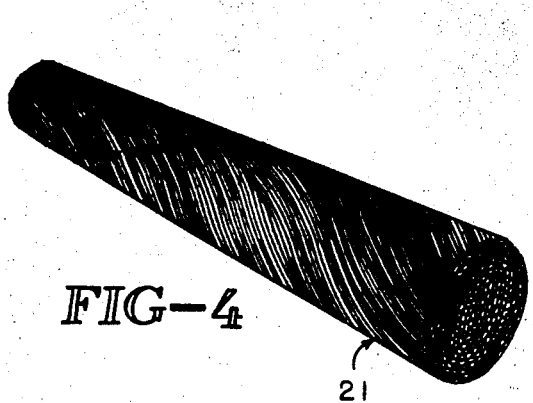
FIG-4
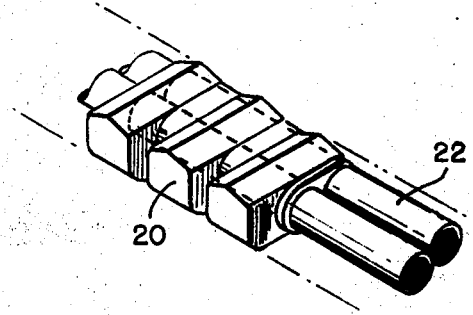
FIG-6
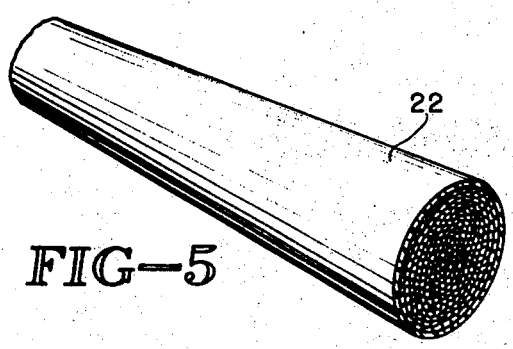
FIG-5
FIG-7
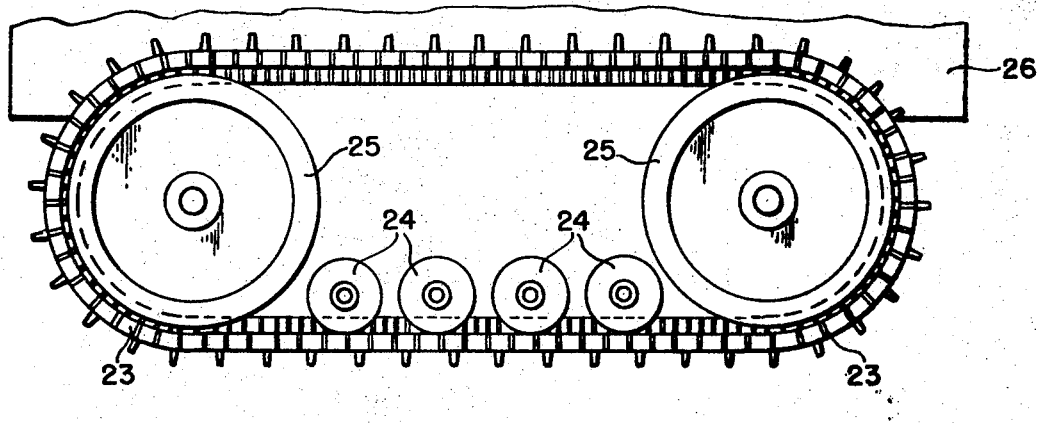

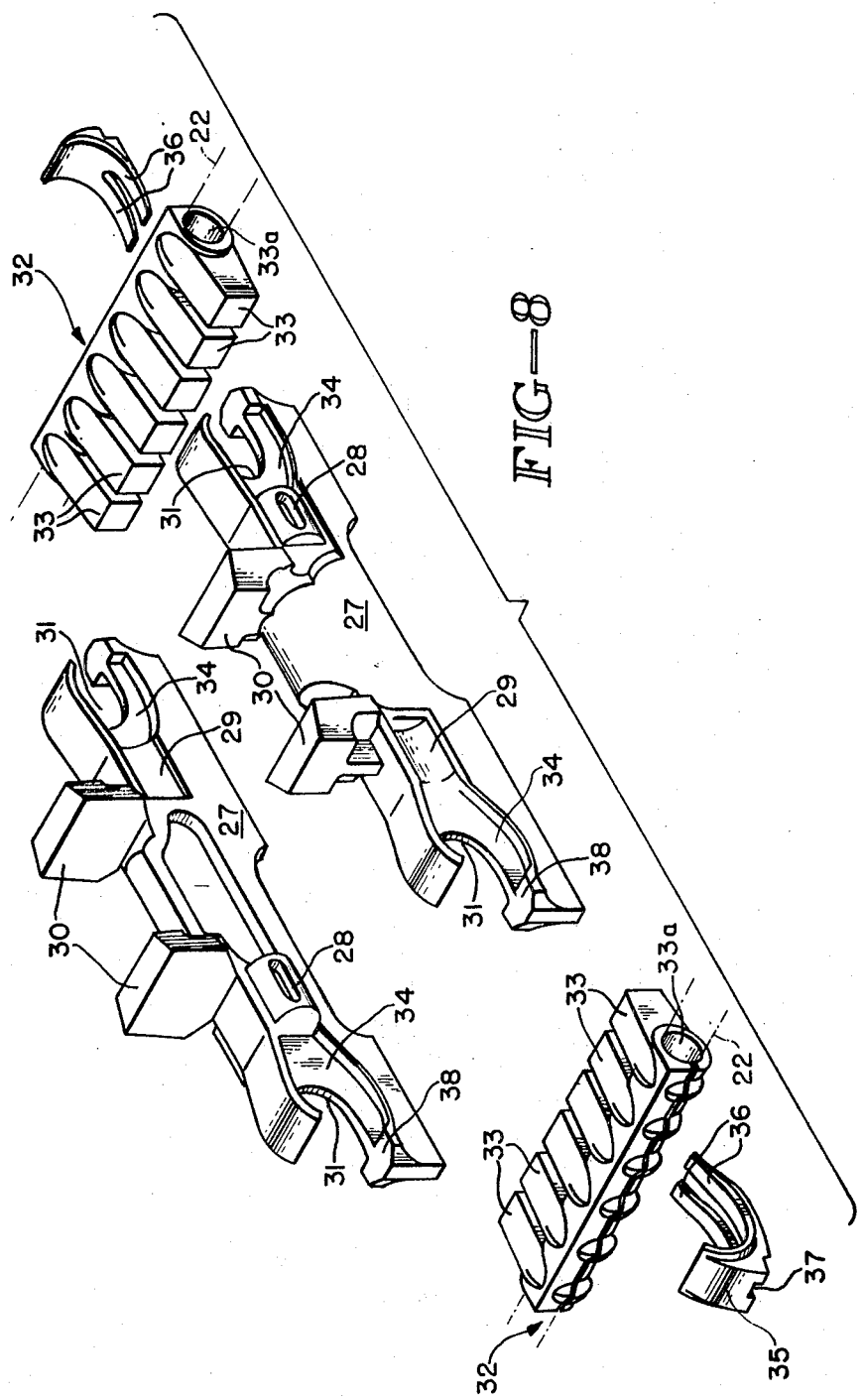

GLASS FIBER CABLE

BACKGROUND OF THE INVENTION

1. Field of the Invention

This invention relates to a coreless multi-strand cable of glass fiber, to a method of making the same, and to an endless track for a track vehicle employing the cable.

2. Prior Art relating to the Disclosure

Glass fiber cable made up of a group of glass fiber strands coated with a resinous material is known. For example, see U.S. Pat. Nos. 3,029,590 and 3,371,476. In U.S. Pat. No. 3,029,950 there is disclosed a composite strand structure made up of bundles of glass filaments embedded in a matrix of elastomeric material twisted and plied with similar composite structures to form a yarn which is then plied with other such structures to form cords or ropes. In U.S. Pat. No. 3,371,476 there is described a glass fiber rope made up of untwisted strands which are coated with a lubricant and a thermosetting resin, the coated strands twisted about a core to form a rope. As is noted in U.S. Pat. No. 3,371,476 cables are usually made using a starter core to control the length of the finished cable and to serve as an anchor for plying initial strands. When such cables are employed for heavy duty work failure of the core of the cable usually occurs prior to failure of the outer strands making up the cable. One of the prime causes of this failure is believed to be a result of failure of the core under tension, failure then progressing to the outer layers.

Endless cables of plied together steel strands have been used to string a plurality of individual track sections together to form an endless track for track vehicles as described in U.S. Pat. No. 3,063,758. Conventional cables have been found to fail relatively quickly under the severe operating conditions as a result of internal strand abrasion, outer strand abrasion and fracture of the strands from the effects of extensive bending and flexing. Conventional cables also elongate under the tension applied when the endless cable is trained about the drive and idler sprockets of a track vehicle. The elongation is such that, after a short period of operation, the endless track cannot be held in position about the drive and idler sprockets.

SUMMARY OF THE INVENTION

This invention relates to a coreless, substantially homogeneous glass fiber cable, to a method of making the same, and to its use as a linkage for strung together individual track elements of an endless track vehicle. The cable is made of a plurality of individual, relatively untwisted glass fiber rovings twisted together, each of the rovings, prior to being twisted together, being impregnated with an uncured elastomeric material. Each roving is made up of a plurality of individual filaments. The expressions "roving," "filament" and "cable" are defined for purposes of this invention as follows:

roving — a plurality of substantially untwisted individual filaments.

filament — a fiber of indefinite length.

cable — an assembly of twisted together rovings.

The individual rovings are spirally twisted together in the same direction under substantially the same tension and at substantially the same helical pitch to produce the cable. The initially spirally twisted rovings are brought back through the junction point of the intertwining rovings where concentric layers of rovings are twisted thereon under the same tension and at the same helical angle. The process is continued until a cable of the diameter desired is made. Preferably, certain of the rovings making up the cable are impregnated with one component of an uncured elastomeric material and the remainder of the rovings impregnated with a curing agent or hardener for the uncured elastomer. When impregnated rovings are twisted together the two components are intimately associated resulting in a cured elastomeric material spacing the individual filaments making up the rovings and the cable from each other.

BRIEF DESCRIPTION OF THE DRAWINGS

FIG. 3 is a partial view of a section of glass fiber roving used in laying up the cable of this invention;

FIG. 4 is a partial perspective view of a cable of this invention made by use of the apparatus of FIG. 1;

FIG. 5 is a partial perspective view of the cable of this invention including an elastomeric sheath surrounding the completed cable;

FIG. 6 is a partial view of a pair of cables of this invention encased in a block of elastomeric material of a configuration designed to cooperate with individual track sections of an endless track for a track vehicle;

FIG. 7 is a slide elevational view of an endless track of a track vehicle, the endless track employing cables of this invention to hold the individual track sections together; and FIG. 8 is an exploded view of an individual track section of a track vehicle employing the cable of this invention to hold the individual track sections together.

DETAILED DESCRIPTION OF THE INVENTION

The glass fiber cable of this invention is of substantially homogeneous cross section, has high tensile strength and low elongation. Certain of the rovings making up the glass fiber cable are coated with one component of a two component elastomeric material while the remainder of the rovings making up the glass fiber cable are coated with the second component. When the individual rovings, consisting of substantially parallel untwisted filaments, are twisted together, the two components react to form a cured elastomeric sheath surrounding each of the filaments.

Figure 2:
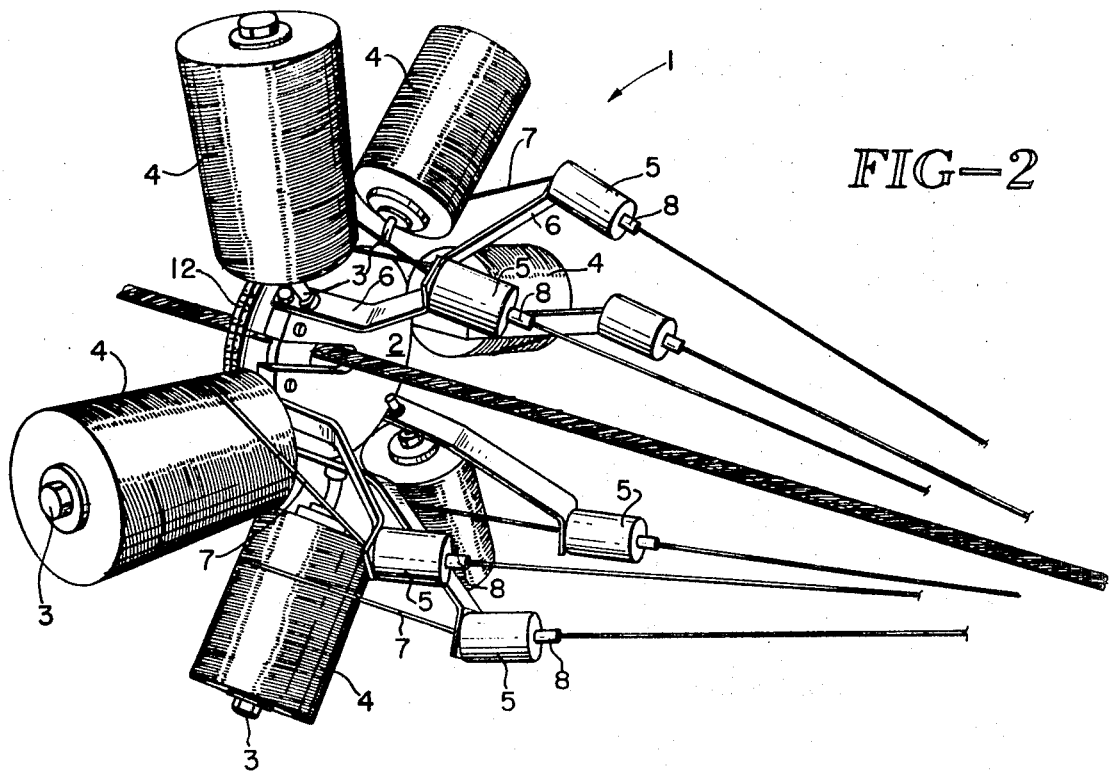
FIG. 2 is a partial perspective view of the planetary winder and associated means for impregnating the glass fiber rovings making up the cable.
Figure 1:
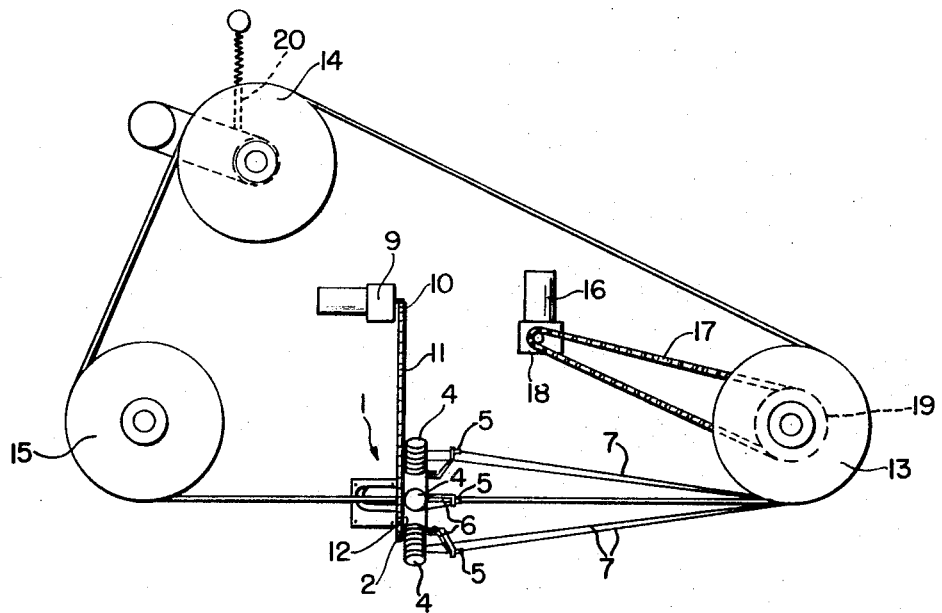
FIG. 1 is a top view of the apparatus for making the cable of this invention.

A suitable apparatus for fabricating the cable of this invention is shown in FIGS. 1 and 2. The apparatus comprises a planetary cabling machine capable of helically winding individual glass fiber rovings together without twisting them. A number of spools of glass fiber rovings are spaced around the periphery of the planetary cabling machine. Adjacent to each of the spools are applicators for applying the uncured prepolymer urethane resin and the polymerizing or curing agent to the rovings. The rovings pass through the applicators. Alternate rovings are impregnated with either uncured resin or curing agent as they are withdrawn from the spools. A portion of the applicators contain uncured resin and the remainder contain a curing agent for the resin in a ratio which produces a cured elastomeric matrix having the desirable physical characteristics when combined at the point of twisting. The cable fromed by intertwining or plying together of the individual glass fiber rovings is fed back through the juncture or common meeting point of the intertwined rovings and a subsequent layer of rovings plied around the initial layer. The process is continued until a cable of the desired diameter is obtained. Because of the way the cable is formed there is no core. Each of the subsequently plied layers is concentrically applied to the already formed cable so that the angle of twist or helical angle is substantially the same as in the initial layer. Throughout formation of the cable, tension on the cable is maintained substantially constant. The end result is a coreless cable with all of the filaments making up the cable at substantially the same helical pitch and coated with a cured elastomeric sheath.

Referring specifically to FIGS. 1 and 2 reference numeral 1 denotes the planetary cabling machine. The machine includes a cabling head 2 around the outer periphery of which are attached a predetermined number of spool holders 3 for holding glass fiber spools 4. Roving 7 drawn from each of the spools 4 mounted on the cabling head 2 passes through associated containers 5 mounted on extension arms 6 before being twisted together. Containers 5 hold the liquid components of the elastomeric material used to coat each of the individual filaments making up the roving and the finished cable. When a two component elastomeric material is used, for example, the ratio of the number of containers holding the uncured liquid resin to the containers holding the curing agent or hardener for the resin is adjusted, depending on the resin used. For the preferred urethane resin, 1 container of liquid resin is used per container of curing agent with the curing agent containers interspersed between every resin container. The roving from each of the spools is passed into the interior of the container from one end thereof where it is totally immersed in the liquid component. Wiping orifices 8 at the outfeed end of each of the containers act to remove excess material from the rovings as they pass out of the containers. The cabling head 2 is rotated by means of a variable speed motor 9 driving sprocket 10 connected to cabling head 2 by means of chain 11 and sprocket 12. The twisted together rovings are trained about driven sheave 13, idler sheave 14 and idler sheave 15, and pass through the hollow axis of the cabling head to the point of intertwining of the rovings issuing from the spools mounted on the cabling head. Subsequent layers of roving are twisted around the initial layup by the rotating motion of the cabling head. Sheave 13 is driven by a variable speed motor 16 through suitable drive means such as chain 17 trained around sprockets 18 and 19. Idler sheave 14 is adjustably mounted so that the tension exerted on the cable, as it is being layed up, can be maintained substantially constant. Idler sheave 15 is preferably located so that the already layed up cable leaves the sheave in the same plane as the axis of the cabling head.

The rotation rate of cabling head 2 and power sheave 13 are variable (1) to permit variation in the rate of plying roving or speed of cable construction and (2) to allow for variation of the roving length of one twist as the cable diameter increases. As cable diameter increases the rate of withdrawal of the glass roving must be greater. This is accomplished by increasing the speed of rotation of drive sheave 13, thereby allowing the helical angle to be maintained constant as cable diameter increases. By the process described a cable having a fairly small and constant helical pitch throughout, i.e. from inner layers of cable to the outer layers is obtained. In addition, laying up the glass fiber cable at a constant helical pitch reduces internal notching or abrasion which occurs when individual filaments cross over underlying filaments in a cable layed up at varying helical angles or cable layed with the direction of strand lay alternating between initial and final plies. A cable used as the linkage element for an endless track vehicle, which is not substantially homogeneous in cross-section, weakens and deteriorates when high loads are applied or when the cable is subjected to extensive flexing because of internal abrasion or cutting effects of the glass fiber filaments. The cable of this invention has no core or starting cable as distinguished from previous cables used.

A spring tension device 20 is for measuring the tension exerted on the cable being layed up as attached to the shaft of idler sheave 14. By maintaining the tension constant on the cable as it is layed up in conjunction with maintaining the helical angle constant, a substantially uniform cable is obtained.

FIG. 3 shows a typical glass fiber roving used in the manufacture of the cable of this invention. The glass fiber roving consists of a group of individual filaments in substantially parallel untwisted relationship. Glass fiber roving such as that manufactured by Owens Corning Glass Inc. is suitable. The glass fiber filaments usually have a diameter ranging from 0.0001 to 0.0006 inches in diameter with the roving comprising 100 to 200 filaments.

The elastomeric materials which may be used to individually coat each of the filaments making up the rovings are commercially available. Preferably, a two component system is sued consisting of a resin component and curing agent or hardener for the resin component. These components are applied to separate and alternating rovings. When the separate rovings are twisted together the resin component and the curing agent are intimately associated with each other resulting in cure of the resin. This method of impregnating the individual filaments of the cable with an elastomeric sheath has distinct advantages over known methods of applying resinous material to roving prior to layup of the cable. Many elastomeric materials, particularly the polyurethanes, have rapid curing times. If the components, i.e. the resin and curing agent, are premixed before application of the filaments, rapidly increasing viscosity and degassing are encountered. If too long a time elapses between mixing of the components and application to the filaments the elastomeric material is substantially cured before the filaments are plied together to form a cable. By the process described such problems are eliminated. This system allows complete escape of entrained air of the polymer components with curing of the polymer delayed by the continuous fresh application of the components as each new layer of glass roving is applied over the previous layer. Excessive tackiness does not develop until after the cable has been completed. The individual filaments making up the cable are each bound to the adjacent filaments by the elastomeric material to form a cable structure having great stability and compactness, the cable structure not twisting or kinking. Further, because each filament is encased in a sheath of elastomeric material, the inherent fragility of the glass fibers, i.e. their low abrasion resistance, is protected. This essentially eliminates internal abrasion and fracture as the cable is bent and flexed during usage and particularly during usage as the linking element for an endless track vehicle.

The amounts of one or both components of the elastomeric material impregnating the rovings can be controlled. Elastomeric materials such as elastomeric polyurethanes and other known elastomeric materials can be used. Preferably a polyurethane sold under the trade name "Uralane" is used although similar or identical products are manufactured under various trade names.

The finished cable is shown in FIG. 4, the cable comprising a plurality of individual filaments twisted together at substantially the same helical angle under constant tension. As can be seen, the cable has no starter core and is homogeneous in cross section. A cable of any desired diameter can be fabricated according to the method previously described. For use as the linkage element in endless track vehicles the diameter of the cable usually ranges from about 7/8 to 1 inch or more.

There is an advantage in applying at least one complete external layer of Nylon monofilament to the already layed up cable to prevent abrasion of the glass filaments. Note FIG. 4 wherein a Nylon monofilament 21 is helically wound around the outer surface of the completed cable. It is also desirous to encase the complete cable in a sheath of elastomeric material 22 as shown in FIG. 5. By doing so internal abrasion of the glass fiber filaments making up the cable is further minimized. The elastomeric material used may be the same or a different material than that used to coat the individual filaments making up the cable.

Although manufacture of the cable has been described using glass fiber roving the cable may be made using other filamentary materials which have the physical properties needed.

The cables of this invention are preferably used, as mentioned, as the linking element in the manufacture of endless track sections for a track vehicle, such as described in United States Patent No. 3,063,758. FIG. 8 shows a possible configuration of an individual track section. The individual track sections are strung on an endless cable of this invention to form an endless track 23 which is trained around idler wheels 24 and power wheels 25 of a track vehicle 26 as shown in FIG. 7. The cable of this invention is encased in a block 20 of elastomeric material having a configuration adapted to conform to the configuration needed for holding individual track sections, such as shown in FIG. 8, together. Cable pairs may be embedded within the block of elastomeric material as shown in FIG. 6 or a single cable may be embedded in the passages through elastomeric blocks 32 shown in FIG. 8. The blocks of elastomeric material surrounding the cables of this invention are designed to space adjacent track sections and cushion adjacent track sections from each other to minimize wear and noise.

Generally the track structure, referring to FIG. 8, includes at least two endless cables interconnected by a series of individual track sections. The track sections are held in registry by means acting between adjacent track sections. Elastomeric spacers integral with the elastomeric block in which the cables are encased cushion the individual track sections as they move around the driving and idler wheels. Each individual track section, (FIG. 8) comprises a section body 27 from which project lugs 28 while lug receiving cavities 29 are provided in opposite sides of the upper portion of the track sections. The central portions of the track sections are offset so as to be disposed closely adjacent in adjacent sections. The inner edges of the central portions of the track section are formed as curved surfaces to provide a composite structure to fit into the recess between adjacent teeth of a driving or idler sprocket on the endless track vehicle. On opposite sides of the central portions are inwardly projecting bosses 30 which engage the ends of the sprockets to assist in retaining the track on the endless track vehicle.

The bosses are not located symetrically at opposite ends of the center of the track section as is evident from FIG. 8 but are offset sufficiently so that they will lie in adjacent relationship but out of registry when the adjacent track sections are assembled. The bosses are of a width considerably greater than the width of the remainder of the track section so that the bosses of adjacent track sections will overlap when the track sections are assembled in side-by-side relationship. Inter-engagement of the bosses also functions to limit relative movement of adjacent track sections transversely of the cables in one direction. Each of the track sections includes a cable receiving aperture 31. As shown in FIG. 8 the access slots communicating with the cable receiving apertures 31 open at opposite ends of the track sections rather than towards the inner side of such sections. Resilient elements made of elastomeric material, serving the function of spacer members, are used. These resilient elements may have a configuration such as shown in FIG. 8 (ref. no. 32) or in FIG. 6. The block of elastomeric material 32 shown adjacent each track section in FIG. 8 has six spacer projections 33 projecting in parallel relationship from one side of the block and spaced apart a distance approximately equal to the thickness of the metal forming the cable receiving apertures. The cables of this invention extend through openings 33a in each of the resilient elements 32. On opposite sides of the cable receiving apertures are recesses 34 corresponding approximately to the profile shape of the spacer projections. The spacer projections fit into the recesses when the block is moved into the cable receiving recesses. When each spacer projection is received in the recess at the side of the track section end and the tubular portion of the block is fitted in the cable receiving aperture a retainer 35 is inserted behind the elastomer block to hold it in place. The retainer 35 is of generally arcuate shape and includes two fingers 36 spaced apart in parallel relationship and adapted to fit into the recesses on opposite sides of the cable receiving aperture so as to straddle the end portion of the track section in which the apertures are formed. The retainer, once inserted, is struck with a hammer or mallet to drive the fingers in until the retainer is in far enough that the notch 37 of the retainer engages the shoulder 38 in the access slot. When the retainer is in this position the elastomeric material of the spacer members is under sufficient pressure so that the force exerted by the spacer members against the retainer holds the notch firmly in engagement with the shoulder.

Tests have shown that the cables of this invention have much improved life over conventional cables. Internal stresses caused by inter-filament abrasion and breakage occur less frequently. Because of the lack of a starter core and the fact that the cable is layed up at substantially the same helical pitch and under substantially the same tension, a uniform cable having high tensile strength, low elongation and uniform properties throughout, is obtained. The cable can be made to almost exact length, i.e. within one-sixty-fourth of an inch by maintaining the cable under constant tension at all times during manufacture thereof.

CABLE STRENGTH AND ELONGATION CHARACTERISTICS

A cable was plied as described, to a diameter of slightly under one inch. At this dimension the theoretical breaking strength of the cable is a function of the number of strands and the individual strength of each strand. The glass strands used have theoretical breaking strengths which, multiplied by the total number used, yield an endless cable structure having an ultimate tensile strength of 60 tons. Breaking tests conducted on cables made according to this invention have determined that breakage occurs between 80 and 85 percent of the theoretical value, or about 50 tons.

Cables constructed of glass strands according to this invention have remarkably low elongation characteristics. The theoretical percent elongation of the glass strands used in making the cable was approximately 2 percent at the break point. At up to 50 percent of the break strength load the percent elongation is less than 1 percent. Elongation of the cable is a function of compaction of strands under increasing load and the elongation of individual strands. The sum of these two factors give an apparent elongation which is determined by load testing up to the break point. Tests performed gave break point elongations of approximately 2.5 percent. Under loads up to 10 tons the elongation of an endless cable 30 feet in circumferential length and made according to this invention was less than 2 inches or about 0.6 percent. Under an average tractor operating load of 3 tons per cable the elongation would be 1 inch or 0.3 percent.

The embodiments of the invention in which an exclusive property or privilege is claimed are defined as follows:

1. A high strength cable of homogeneous cross-section made up of a plurality of substantially untwisted non-metallic fiber rovings twisted together without substantial twisting of the individual filaments making up the rovings, each roving comprising a plurality of filaments with each filament coated with a cured elastomeric sheath and bonded to the elastomeric sheath surrounding adjacent filaments, of both the same and other adjacent rovings the initial layer of rovings spirally twisted together in the same direction under constant tension and overlapping layers of rovings spirally twisted together, each at the same helical angle, direction and tension as the initial layer.

2. The cable of claim 1 including a sheath of cured elastomer surrounding and bonded to the layed up cable.

3. The cable of claim 1 wherein the elastomeric material is a urethane elastomer.

4. A high strength, low elongation cable of homogenous cross-section made up of a plurality of substantially untwisted glass fiber rovings twisted together without substantial twisting of the individual filaments making up the rovings, each rovings comprising a plurality of glass fiber filaments with each filament coated with a cured elastomeric sheath and bonded to the elastomeric sheath of adjacent filaments of both the same and other adjacent rovings, the initial layer of rovings spirally twisted together in the same direction under constant tension and overlapping layers of rovings spirally twisted together, each at the same helical angle, in the same direction and under the same tension as the initial layer.

* * * * *